June 3, 1958 H. V. ALEXANDERSSON 2,837,600

CONTROLLING DEVICE IN COIN BOXES

Filed Dec. 20, 1955

INVENTOR
HARALD VALDEMAR ALEXANDERSSON

By Hane and Nydick
ATTORNEYS

United States Patent Office 2,837,600

Patented June 3, 1958

2,837,600

CONTROLLING DEVICE IN COIN BOXES

Harald Valdemar Alexandersson, Lidingo, Sweden, assignor to Telefonaktiebolaget L M Ericsson, Stockholm, Sweden, a corporation of Sweden Application December 20, 1955, Serial No. 554,325

Claims priority, application Sweden December 23, 1954

1 Claim. (Cl. 179—6.5)

This invention relates to pay stations for telephone systems, preferably to such pay stations, where the deposit of a coin in the coin box of the station produces the closing of a circuit, said circuit uses ground as return conductor being closed by a coin chute contact in the coin box and includes a current source and a relay in the telephone exchange. When ground is used for the signal sending it is generally possible to produce the signal which marks the deposit of a coin by a temporary ground connection of some part in the telephone instruments of the pay station, which instruments cannot be protected against tampering, e. g. with the hand microtelephone and its cord.

It is an object of the invention to prevent that communications can be established by means of signals of payment caused by an unauthorized grounding of a component.

The aforementioned object of the invention and other objects, features and advantages which will be pointed out hereinafter are attained by providing a check circuit system of the general kind above referred to which comprises a telephone pay station including a telephone apparatus, a coin chute, a movable coin pawl biased to extend into the coin chute at an upper coin position, a pawl operating electro-magnet withdrawing said pawl when energized, a normally open coin contact at a lower coin position and closed by a coin passing through the chute, a contact means in the telephone exchange actuated by the deposition of a coin, a grounded circuit means including said electro-magnet, one wire of said line and a reset relay for restoring said line and causing energization of the pawl withdrawal electro-magnet, actuation of said contact means disconnecting said line and closing said circuit means through ground, a by-pass circuit arranged to be closed by closing of said coin chute contact upon passage of a coin through the chute for reducing the resistance in said circuit means, reduction in resistance causing energization of the reset relay, a cut-off switch contact included in circuit with said telephone apparatus in the pay station and the line, said cut-off switch contact being operated by the electro-magnet to disconnect the telephone apparatus during the passage of a coin through the chute, and a control relay in the telephone exchange, said control relay having contacts controlling the energization of said reset relay, the coil of said control relay being included in said circuit means and responsive to the same current strength as said electro-magnet but requiring less operating current strength and being slower energized to make than said reset relay whereby the restoration of the communication line by the reset relay is blocked until the control relay is energized.

The invention will now be described more in detail in connection with the drawings Figs. 1–3.

Figure 1:
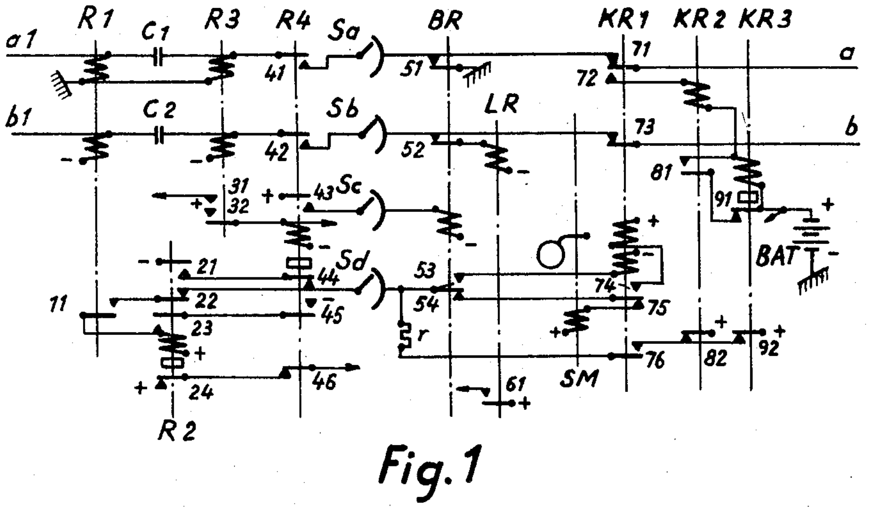
Fig. 1 shows the components of the system of the invention disposed in the telephone exchange.
Figure 2:
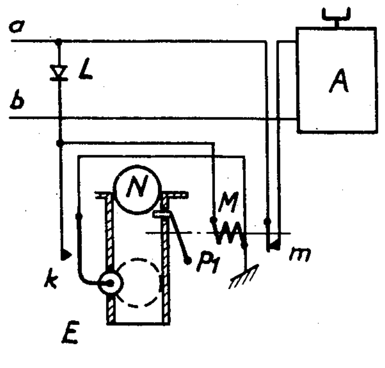
Fig. 2 shows the pay station including a coin box with a rectifier and a coin chute contact which short-circuits the deposit magnet.
Figure 3:
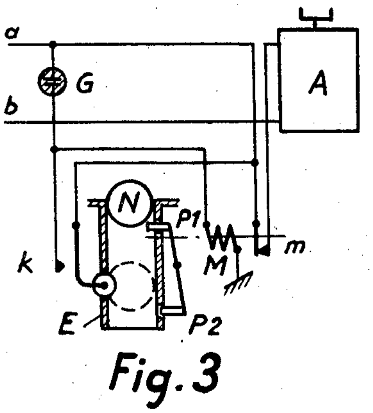
Fig. 3 shows a modification of the pay station including a coin box with a glow discharge tube which is short-circuited by the coin chute contact.

According to the Figures 2–3 the pay station comprises a standard telephone apparatus A and a coin additional instrument containing a coin chute E, with an upper coin pawl P1, a deposit magnet M and a coin chute contact *k* and electric valve consisting of a rectifier L or a glow discharge tube G. The pay station is connected by means of a line *ab* with a telephone exchange, Fig. 1. In the telephone exchange there is a line equipment comprising a line relay LR, a cut-off relay BR, a subscriber's meter SM and three relays KR1–KR3, relay KR1 constituting a contact device for breaking the communication over the line *ab*, KR2 being a reset relay and KR3 a control relay. In the telephone exchange there is furthermore a line-finder *Sa–Sd* with a link circuit containing the relays R1–R4. In addition to the standard exchange battery there is also a current source BAT.

At calls from the apparatus A the line relay LR operates in the telephone exchange. The contact 61 is closed and starts the line-finder S, which in a known manner is associated with the line *ab*, whereby the holding relay R4 attracts its armature. The circuits necessary for this are unessential to the invention, for which reason they have been omitted in the figure. The contacts 41–46 are actuated. The cut-off relay BR is energized in a circuit through the contact 43 and the wiper *Sc*. The contacts 51–54 are actuated. The feeding relay R3 is energized in a circuit from ground, the upper winding of the relay R3, the contact 41, the wiper *Sa*, the contact 71, the *a*-branch, the contact *m*, the telephone apparatus A, the *b*-branch, the contact 73, the wiper *Sb*, the contact 42 and the lower winding of the relay R3, to minus. The contacts 31–32 are closed, whereby the holding relay R4, which is slow-releasing, is held energized and a circuit for transmitting impulses is closed. The calling person then emits impulses by means of the dial in the apparatus A and a connection is set up through the condensers C1 and C2 and the wires $a_1$—$b_1$.

The line *ab* has normally a negative voltage and so low a voltage, that neither the rectifier L in Fig. 2 nor the glow discharge tube G in Fig. 3 transmits current.

If the calling subscriber answers, the relay R1 is energized and the contact 11 is closed. The following circuit is completed: + the winding on the relay R2, the contacts 11 and 22, the wiper *Sd*, the contact 53, the lower winding of the relay KR1, to minus. The relays R2 and KR1 are energized whereby the relay KR1 is faster than relay R2, which is slow both to make and to break. The contacts 71–76 and 21–24 are actuated. The contact 22 breaks the make-circuit and the relay R2 is held energized through the contacts 45 and 23 while the relay KR1 is held energized in a circuit through the contacts 82 and 92 and 76, the resistance *r* and the contact 53. The contacts 71 and 73 break the communication over the line *ab* and the contact 72 is closed in the following circuit: ground, the current source BAT, the winding on relay KR3 and KR2, the contact 72, the *a*-branch, the rectifier L in Fig. 2 or the glow discharge G in Fig. 3, the deposit magnet M, to ground. Thus the line *ab* gets a positive voltage from the current source BA1, whereby the rectifier L becomes current carrying or the glow discharge tube G is ignited. The deposit magnet M attracts its armature, the pawl P1 opens and the contact *m* breaks. A coin N will now fall into the coin chute E and actuate the coin chute contact *k*. This takes a certain time which may be adapted to the length and inclination of the coin chute. During this moment the relay KR3 is energized, said relay being slow to make and break but working at substantially the same current strength as the magnet M. The relay KR2 is fast to make and break but requires considerably more current through the magnet M and the relay KR3, due to which it does not attract until the coin N actuates the contact *k*, thus causing a decrease of the resistance in the circuit, e. g. by short-circuiting the winding of the magnet M in Fig. 2 or the glow discharge tube G in Fig. 3.

Here it is supposed that the relay KR3 is energized during the passage of the coin N from the upper coin position to the lower. The contacts 91 and 92 are actuated. When the contact *k* is closed, the relay KR2 is attracted. The contacts 81–82 are actuated. The holding circuit for the relay KR1 is broken by the contacts 82 and 92 and the relay KR1 releases, whereby the communication over the line *ab* is restored. The length of the conversation is here supposed to be unlimited. When the conversation is ended, the calling person puts down the hand microtelephone of the pay station. The relays R3, R4 and BR are released and the subscriber's meter SM receives current through the contacts 21 and 44, the wiper S*d* and the contacts 54 and 75. The communication is disconnected when the relay R2 releases.

If no coin falls into the coin chute E, the relay KR2 does not attract and the relay KR1 remains energized until the holding relay R4 releases its armature. The relay BR releases and the relay KR1 is held energized through the contacts 21 and 44, the wiper S*d*, the contacts 54 and 74 through its upper winding. The communication is disconnected and the relay KR1 releases, when the relay R2 is released.

If a calling person tries to imitate the operation of the coin N by the contact *k* by connecting some part of the apparatus A to ground, two situations may arise:

(1) The *a*-branch of the line is connected to ground, when the contact 72 is closed. Thus the fast relay KR2 is operated before the relay KR3. The contact 81 short-circuits the winding of the relay KR3 and prevents the relay KR3 from operating. The relay KR1 is held operated and the communication is disconnected.

(2) The *a*-branch of the line is connected to ground after the contact 72 has been closed. The apparatus A is thus disconnected by the contact 73 and the contact *m* of the deposit magnet, and grounding cannot prevent the disconnection of the communication.

I claim:

A check circuit system preventing the connection of a telephone pay station to a two-wire communication line of a telephone exchange without the insertion of a coin, said check system comprising, in combination, a telephone pay station including a telephone apparatus, a coin chute, a movable coin pawl biased to extend into the coin chute at an upper coin position, a pawl operating electro-magnet withdrawing said pawl when energized, a normally open coin contact at a lower coin position and closed by a coin passing through the chute, a contact means in the telephone exchange actuated by the deposition of a coin, a grounded circuit means including said electro-magnet, one wire of said line and a reset relay for restoring said line and causing energization of the pawl withdrawal electro-magnet, actuation of said contact means disconnecting said line and closing said circuit means through ground, a by-pass circuit arranged to be closed by closing of said coin chute contact upon passage of a coin through the chute for reducing the resistance in said circuit means, reduction in resistance causing energization of the reset relay, a cut-off switch contact included in circuit with said telephone apparatus in the pay station and the line, said cut-off switch contact being operated by the electro-magnet to disconnect the telephone apparatus during the passage of a coin through the chute, and a control relay in the telephone exchange, said control relay having contacts controlling the energization of said reset relay, the coil of said control relay being included in said circuit means and responsive to the same current strength as said electro-magnet but requiring less operating current strength and being slower energized to make than said reset relay whereby the restoration of the communication line by the reset relay is blocked until the control relay is energized.

References Cited in the file of this patent

UNITED STATES PATENTS

| | | |
|---|---|---|
| 1,386,701 | Goodrum | Aug. 9, 1921 |
| 2,278,436 | Friend | Apr. 7, 1942 |